United States Patent [19]

Yasumoto et al.

[11] Patent Number: 5,442,403
[45] Date of Patent: Aug. 15, 1995

[54] WIDE-SCREEN TV SIGNAL TRANSMISSION APPARATUS

[75] Inventors: Yoshio Yasumoto, Nara; Sadashi Kageyama, Hirakata; Shuji Inoue, Moriguchi; Hideyo Uwabata, Osaka, all of Japan

[73] Assignee: Matsushita Electric Industrial Co., Ltd., Osaka, Japan

[21] Appl. No.: 946,008

[22] Filed: Sep. 15, 1992

Related U.S. Application Data

[63] Continuation of Ser. No. 626,291, Dec. 12, 1990, abandoned.

[30] Foreign Application Priority Data

Dec. 18, 1989 [JP] Japan .................................. 1-327896

[51] Int. Cl.$^6$ ......................... H04N 7/12; H04N 7/01
[52] U.S. Cl. .................................... 348/432; 348/439; 348/458; 348/913
[58] Field of Search ................ 358/141, 140, 133, 180, 358/142, 11, 12; H04N 7/12, 7/01, 7/00, 7/04; 348/432–439, 445–448, 458, 459, 913

[56] References Cited

U.S. PATENT DOCUMENTS

| | | | |
|---|---|---|---|
| 4,394,690 | 7/1983 | Kobayashi | 358/146 |
| 4,654,696 | 3/1987 | Dayton et al. | |
| 4,931,855 | 6/1990 | Salvadovini | 358/141 |
| 4,961,112 | 10/1990 | Sugimori et al. | 358/140 |
| 4,984,078 | 1/1991 | Skinner et al. | 358/11 |
| 4,984,081 | 1/1991 | Miyoshi et al. | 358/140 |
| 4,989,091 | 1/1991 | Lucas | 348/458 |
| 5,068,728 | 11/1991 | Macovski | 358/141 |
| 5,075,773 | 12/1991 | Pullen et al. | 358/141 |
| 5,084,765 | 1/1992 | Morita et al. | 358/141 |
| 5,097,332 | 3/1992 | Faroudja | 358/141 |
| 5,142,364 | 8/1992 | Sugimori et al. | 358/141 |

FOREIGN PATENT DOCUMENTS

| | | | |
|---|---|---|---|
| 1253381 | 10/1989 | Japan | H04N 7/12 |
| 1258581 | 10/1989 | Japan | H04N 7/012 |
| 1314079 | 12/1989 | Japan | H04N 7/00 |
| 9009719 | 8/1990 | WIPO | H04N 7/00 |

OTHER PUBLICATIONS

"HDTV and Today's Broadcasting World", Yozo Ono, New York, N.Y., (Abstract).

"Better Video Images", 23rd Annual SMPTE Television Conference in San Francisco, Calif., Feb. 3–4, 1989, pp. 313–360.

*Primary Examiner*—James J. Groody
*Assistant Examiner*—Michael H. Lee
*Attorney, Agent, or Firm*—Wenderoth, Lind & Ponack

[57] ABSTRACT

A wide-screen TV signal transmission apparatus includes transmitting a wide-screen TV signal generator for generating a wide-screen TV signal source; a scanning line converter for down-converting a wide-screen TV signal with an integer conversion ratio to obtain a conventional TV-compatible signal with upper and lower black bars; a vertical augmentation signal generator for generating a vertical augmentation signal to enhance the vertical resolution at the receiving side of the transmission apparatus; and adder for adding; a conventional TV-compatible signal and a vertical augmentation signal to obtain a conventional TV-compatible composed signal; and a transmitter for transmitting a conventional TV-compatible composed signal. The wide-screen TV signal transmission apparatus includes, in its receiving side a video signal detector for detecting a video signal from a transmitted modulated conventional TV-compatible composed signal to obtain a baseband video signal; a signal separater for separating the base-band video signal into luminance and chrominance signals with upper and lower black bars; a scan-convertor for up-converting the luminance and chrominance signals with upper and lower black bars into luminance and chrominance signals without upper and lower black bars with as integer conversion ratio; a vertical augmentation signal processor for recovering the vertical augmentation signal; an adder for adding luminance and chrominance signals without upper and lower black bars and the vertical augmentation signal to obtain a wide-screen TV signal with a high vertical resolution; and a display device for displaying the wide-screen TV signal with a high vertical resolution.

4 Claims, 11 Drawing Sheets

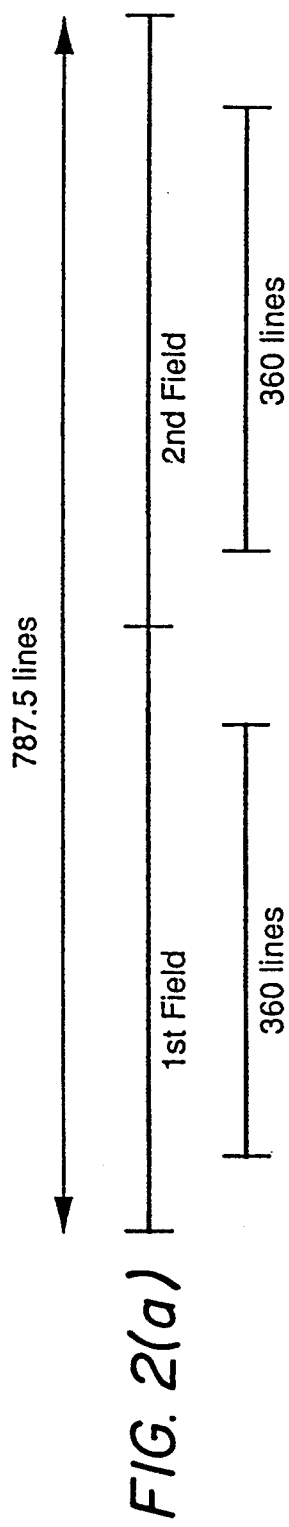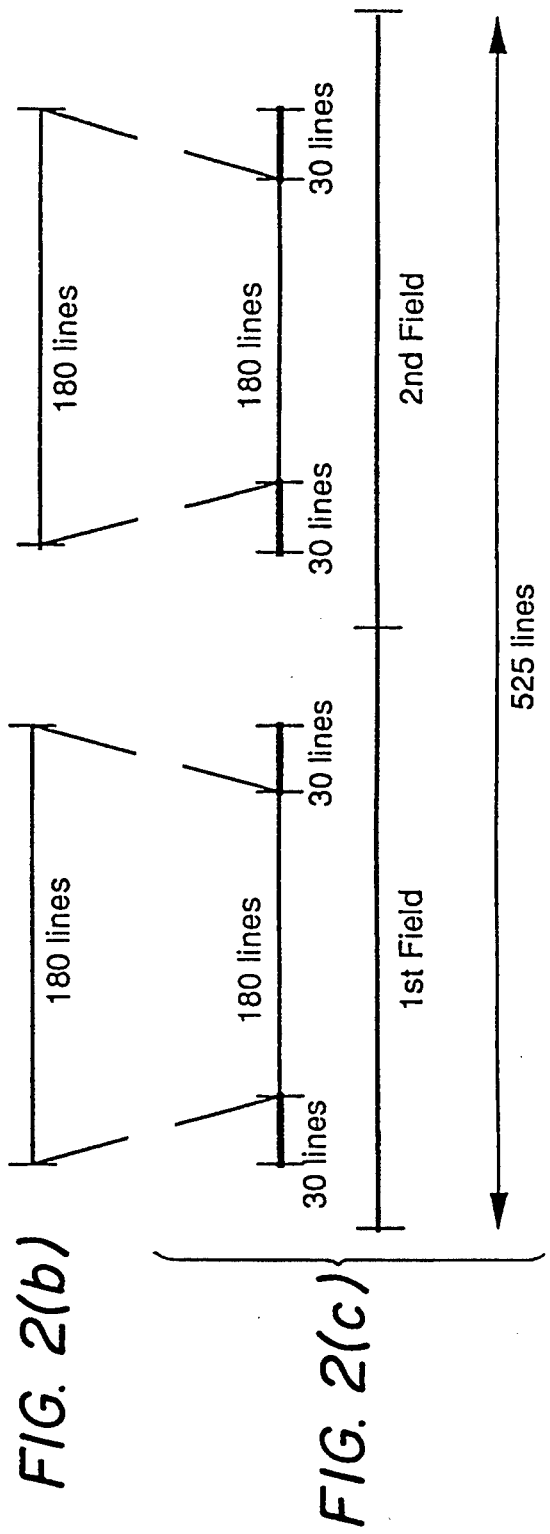
FIG. 2(a)
FIG. 2(b)
FIG. 2(c)

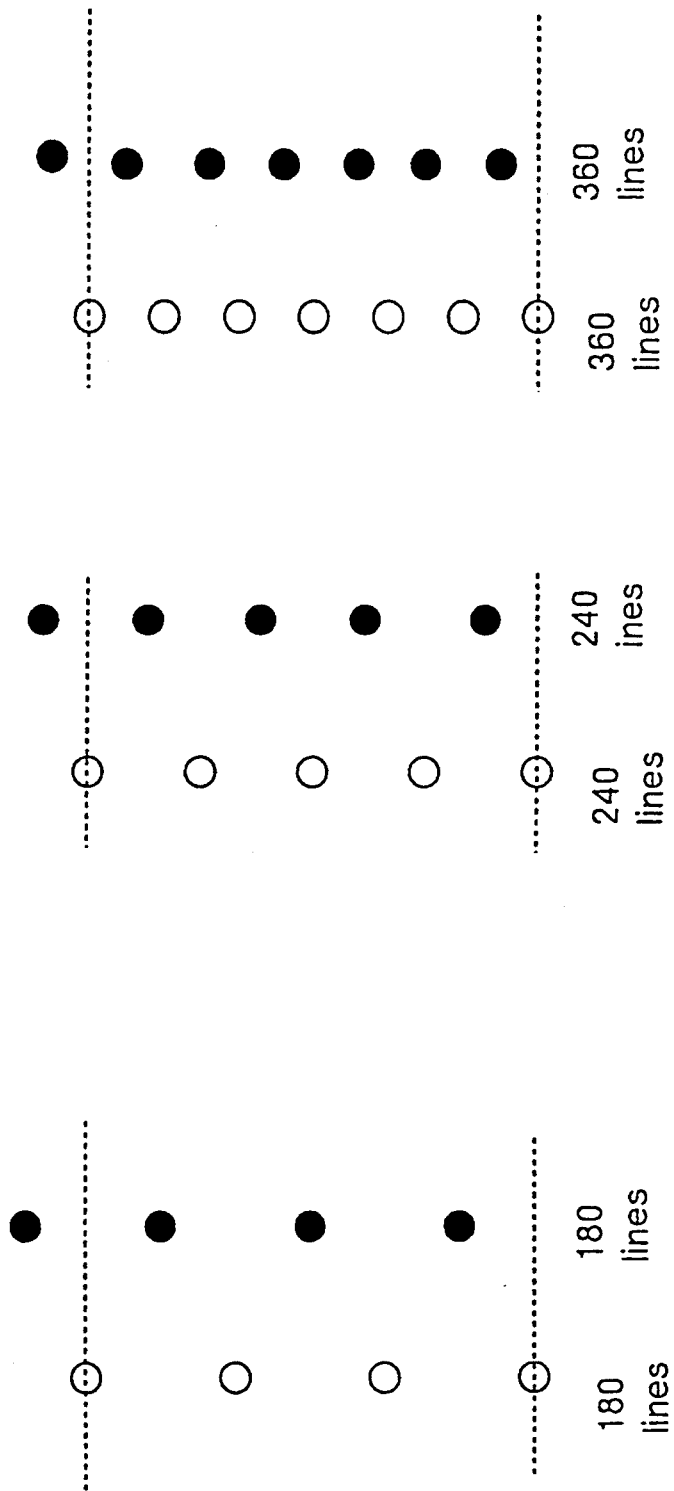
FIG. 4(a) Transmission — 180 lines / 180 lines
FIG. 4(b) Display — 240 lines / 240 lines
FIG. 4(c) Display — 360 lines / 360 lines

FIG. 5(a) Prior Art — original image — 480 × 525/2:1

FIG. 5(b) Prior Art — transmitting image — 360 × 525/2:1

FIG. 5(c) Prior Art — regenerated image — 480 × 525/2:1

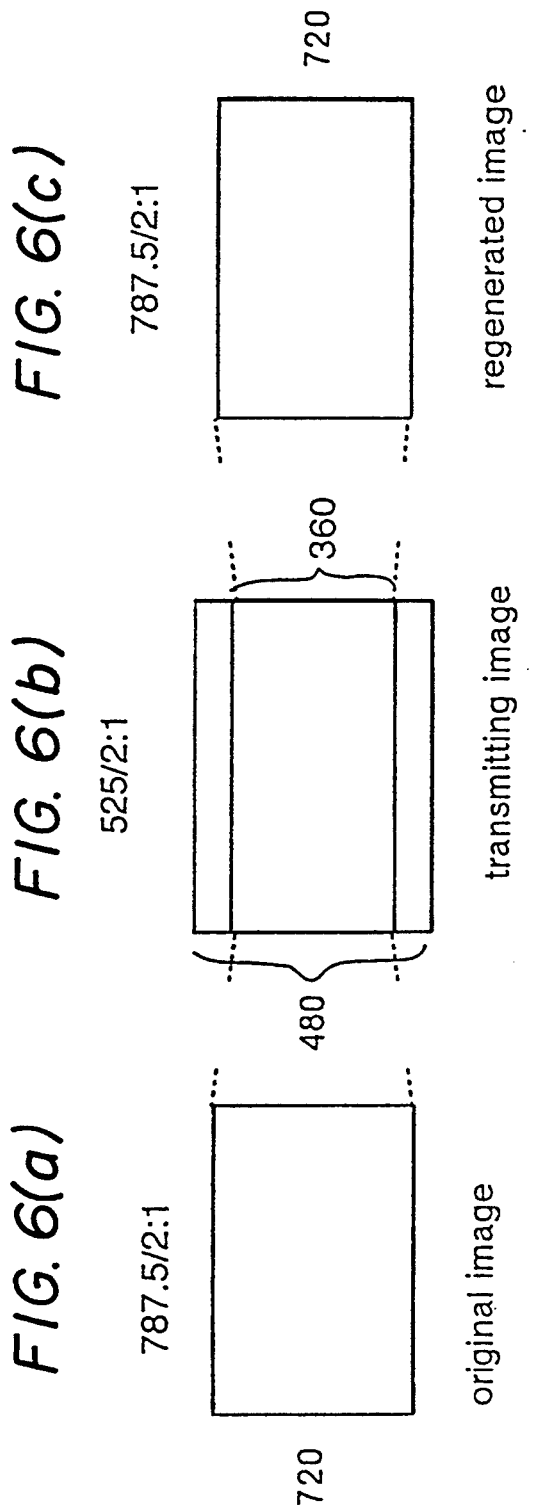

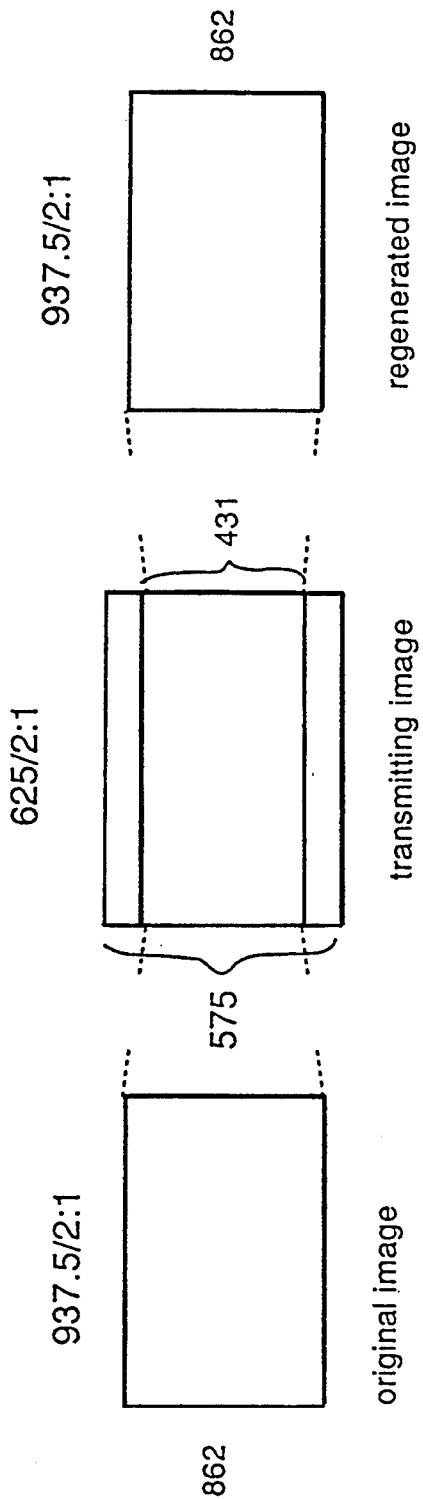

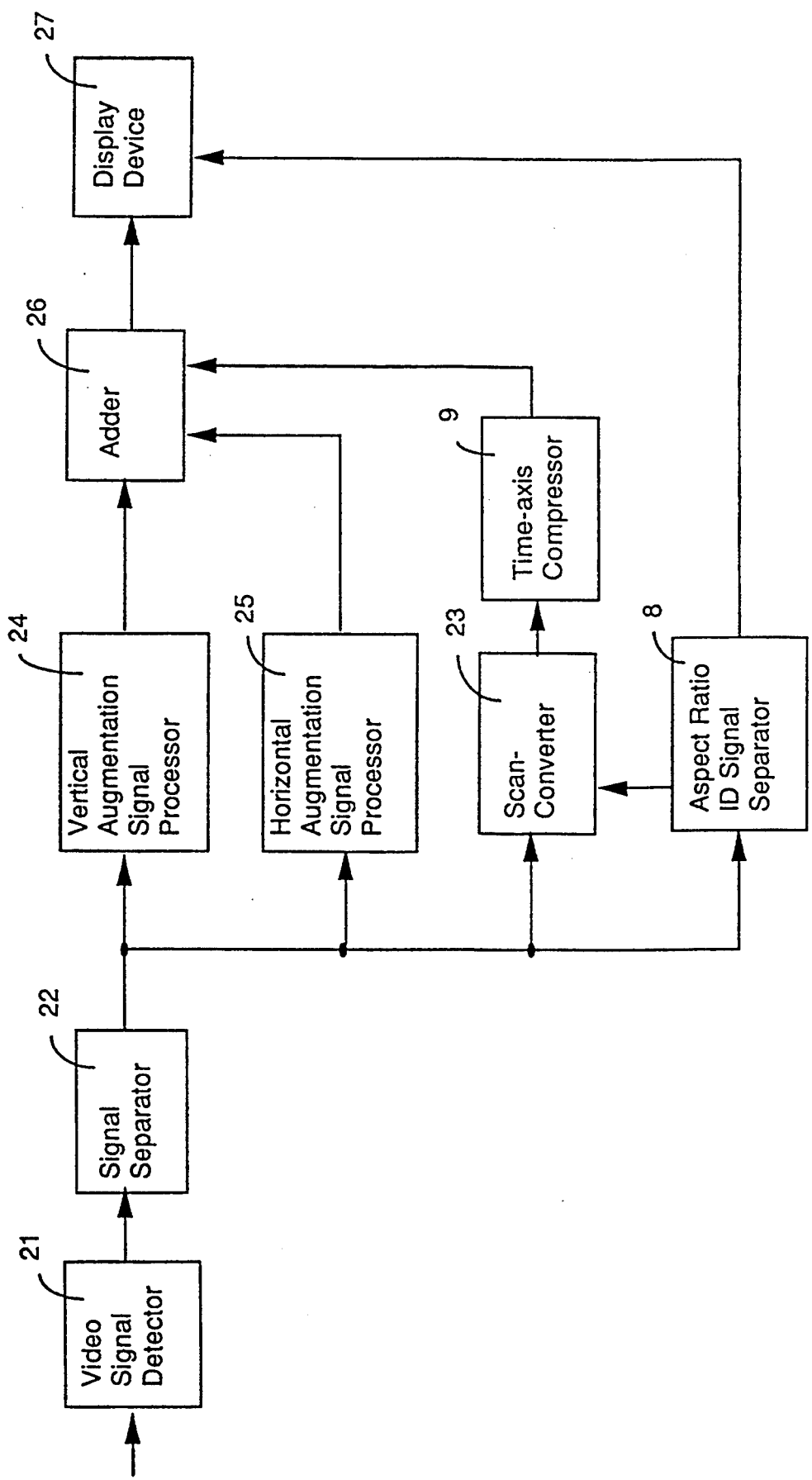

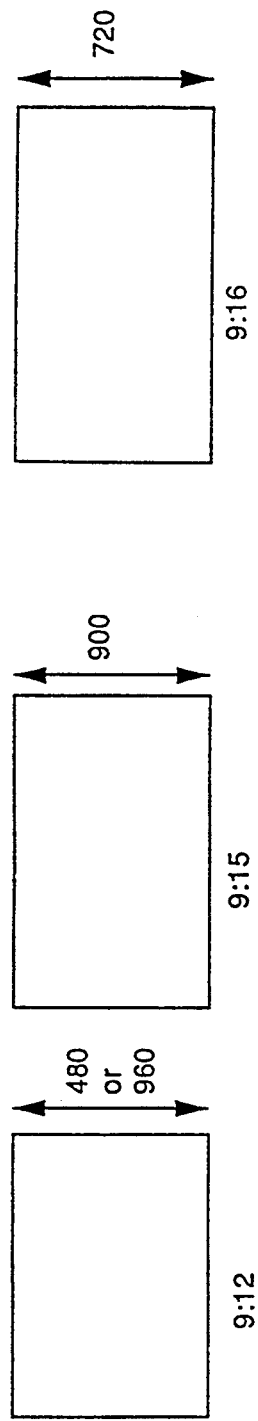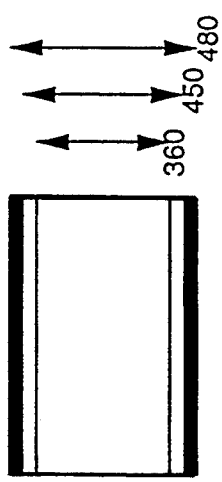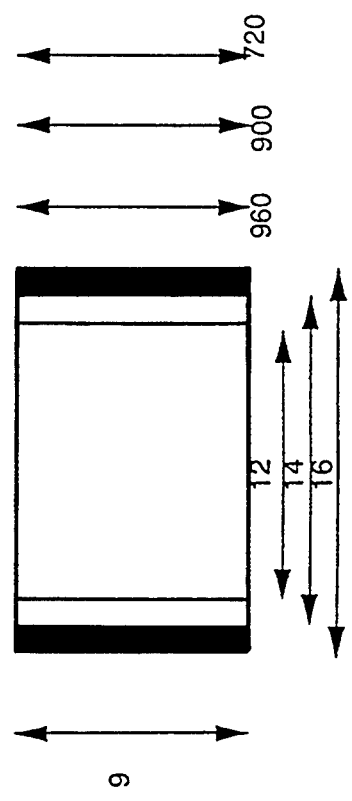
FIG. 9(a) signal source
FIG. 9(b) at transmission
FIG. 9(c) receiver

WIDE-SCREEN TV SIGNAL TRANSMISSION APPARATUS

This application is a continuation of now abandoned application, Ser. No. 07/626,291, filed Dec. 12, 1990, now abandoned.

BACKGROUND OF THE INVENTION

1. Field of the Invention

This invention relates to an apparatus for transmitting a wide-screen TV signal, while keeping, the compatibility with an existing TV standard, and for receiving and displaying the wide-screen TV signal with fixed-rate horizontal scanning lines.

2. Description of the Prior Art

More than 37 years have passed since the color television broadcasting of the current NTSC (National Television System Committee) system was introduced in 1954 in the United States. In Europe, they have used the PAL (Phase Alternative Line) system since 1967. Recently, in search of a finer definition and higher performance television system, several new systems including the HDTV (High Definition Television) system have been proposed. At the same time, the contents of the programs presented to viewers have been changed from the mere studio programs to programs providing higher quality images and more realistic feeling such as cinema-size movies.

The current NTSC broadcasting is standardized by 2:1 interlaced 525 scanning lines, a luminance signal bandwidth of 4.2 MHz, and an aspect ratio of 4:3. (See, for example, Pritchard, "US Color Television Fundamentals -A Review", IEEE Trans. Consumer Electron., vol. CE-23, pp. 467-478, November 1977.) The current PAL broadcasting is standardized by 2:1 interlaced 625 scanning lines, a luminance signal bandwidth of 5.0 MHz in Germany, or 5.5 MHz in the U.K., and an aspect ratio of 4:3.

In this background, several television signal composition methods aiming at compatibility with the current broadcasting system and enhancement of horizontal and vertical resolution have been proposed. One such example is presented in a paper of Faroudja and Roisen, "Improving NTSC to achieve near-RBG performance", SMPTE J., vol. 96, pp. 750-761, August 1987. They use a comb filter to split luminance and chrominance signals at the transmitting end and avoid crosstalk between them at a receiver. This method is useful for eliminating an annoying crosstalk on the received image, but horizontal and vertical high frequency components of the luminance signal cannot be transmitted, nor can an enhancement of the resolution be attained.

Another example is presented in a paper of Fukinuki and Hirano, "Extended Definition TV Fully Compatible with existing Standards", IEEE Trans. Commun., vol. COM-32, pp. 948-953, Aug. 1984. Considering the NTSC television signal expressed on a two-dimensional plane of temporal frequency f1 and vertical frequency f2, chrominance signals C are present in the second and fourth quadrants due to their phase relationship to the chrominance subcarrier fsc. The Fukinuki et al example uses the vacant first and third quadrants for multiplexing the high frequency components of the luminance signal. These vacant quadrants are called the "Fukinuki Hole" after the inventor. The chrominance signal and the multiplex high frequency components are separated and reproduced at the receiving end, thereby enhancing the horizontal resolution. In this example, the conventional NTSC receiver would be interfered with by the multiplex signal, because the example has no ability for separating the chrominance signal from the multiplex high frequency components.

In the current television broadcast, as is clear from the description above, the signal bandwidth is limited by the standard, and it is not easy to add some new information with a high quality. For example, other methods to enhance the horizontal resolution have been proposed (M. Isnardi et al, "A Single Channel NTSC Compatible Widescreen EDTV System", HDTV Colloquium in Ottawa, October, 1987), but many problems are left unsolved from the viewpoint of the compatibility with the current television broadcasting and the deterioration of demodulation characteristics of the high frequency components in a moving picture. Besides, from the standpoint of effective use of the frequency resources, the transmission band cannot be easily extended.

We invented a method of superposing a signal by using quadrature modulation of the video carrier (see U.S. Pat. No. 4,882,614 issued Nov. 21, 1989, or see Yasumoto et al, "An extended definition television system using quadrature modulation of the video carrier with inverse Nyquist filter", IEEE Trans. Consumer Electron., vol. CE-33, pp. 173-180, August 1987). By this method, various signals can be transmitted using a newly established quadrature channel and the interference to the conventional NTSC receiver is very small in principle. But the interference can be detected in practice, because of the incompleteness of the characteristics of the filters used by the receiver and the transmitter.

We also reported transmitting wide-screen images which are compatible with the conventional standard, using quadrature modulation of the video carrier. (See. Yasumoto et al, "A Wide aspect ratio television system with full NTSC compatibility," IEEE Trans. on Consumer Electronics. Vol CE-34, No. 1. February, 1988.) In this paper we described transmitting side panels which are left and right parts of a wide-screen image after separating the side panels and the center panel(4:3 portion), and re-composing them at the receiving side. This method of transmitting wide-screen images by splitting the side panels and the center panel is called the "side panel method".

Another method to transmit wide-screen images which are compatible with the existing standard is called the "letter box method". In this method, one can see a 16:9 wide-screen image even with the conventional receiver although black bars appear both on the upper and lower parts of the image. Using these black parts, we can transmit additional signals for enhancing the horizontal and vertical resolution. One example using this method is described in the Lippman et al paper entitled: "Single-channel backward-compatible EDTV systems", SMPTE Journal, Vol. 98, No. 1, January, 1989.

There are some advantages and disadvantages both in the side panel method and the letter box method. The disadvantage with the side panel method is the stitching of the side panels and the center panel. During severe receiving conditions, just as with weak electric or multipath fields, it is easy to detect the differences between the panels due to noise or ghosts. One of the other disadvantages with the side panel method is the difficulties in selecting the center panel out of the wide-screen image. There arises a problem if an important object disappears in the center panel on the conventional receiver. It is also difficult to select the center panel out of the wide-screen image according to the desire of the director at the transmitting side.

The disadvantage with letter box method is the difficulties to find a channel for transmitting the high frequency component of the luminance signal in order to compensate for the loss of the vertical resolution of the original image. One possibility is to transmit it in the black bars. It is still a problem to reconstruct the original image with a full vertical resolution at the receiving side. All examples of the letter box method so far adopt 360 lines out of 480 lines with the NTSC standard, and recover 480 lines at the receiving side. The conversion from 360 lines to 480 lines (3 to 4) consumes a large amount of circuits and line memories.

This invention relates to how to reconstruct the original image at the receiving side with a simple circuit, using the letter box method.

SUMMARY OF THE INVENTION

It is a primary object of this invention to provide a wide-screen TV signal transmitting apparatus which is compatible with the conventional TV standard, especially with an efficient circuit for reconstructing the original wide-screen image at the receiving side.

According to this invention, an integral multiple of the effective horizontal lines of the reduced lines at the transmitting side are used at the receiving side in order to avoid complicated conversion of line numbers at the receiving side. A simple example is 2 as the integer, when 720 effective horizontal lines are used as a result of the conversion from 360 lines at the receiving side. This only requires a simple conversion of 1 to 2.

At the transmitting side, if 360 lines are necessary to send the wide-screen image with the letter box method, 720 lines are suitable because of the simple conversion, although there is little problem with a complicated conversion because transmission equipment have little cost sensitivity. But, simple conversion still makes sense. On the other hand, TV receivers have a high cost sensitivity, so this invention is very useful.

In general, when we transmit m:9 (m: real number, m>12) aspect ratio image, 480×12/m lines should be used out of 480 lines at the transmitting side in order to the conform to letter box method, and the original wide-screen signal source has 480×12×n/m (n=1,2,3 . . .) lines. In the receiving side, 480×12×n/m (n=1,2,3 . . .) lines are used after a simple up-conversion. Furthermore, if information of the aspect ratio is transmitted, the number of scanning lines can be controlled at the receiving side; therefore it is possible to transmit various images with different aspect ratios and a wide-screen receiver can adapt itself to the different format instantaneously.

BRIEF DESCRIPTION OF THE DRAWINGS

FIGS. 2(a)–2(c) are figures for explaining the function of a scan-converter in the wide-screen TV signal transmitting apparatus at the transmitting side;

FIGS. 4(a)–4(c) are figures for explaining the function of a scan-converter in the wide-screen TV signal transmitting apparatus both at the transmitting and receiving sides;

FIGS. 5(a)–5(c) are examples of the display screen of a prior art;

FIGS. 6(a)–6(c) are examples of the display screen of a wide-screen TV signal transmitting apparatus embodying this invention when applied to the NTSC standard;

FIGS. 7(a)–7(c) are examples of the display screen of a wide-screen TV signal transmitting apparatus embodying this invention when applied to the PAL standard;

FIGS. 9(a)–9(c) are figures for explaining a multi-aspect ratio TV signal transmitting method.

DETAILED DESCRIPTION OF THE PREFERRED EMBODIMENTS

Figure 1A:
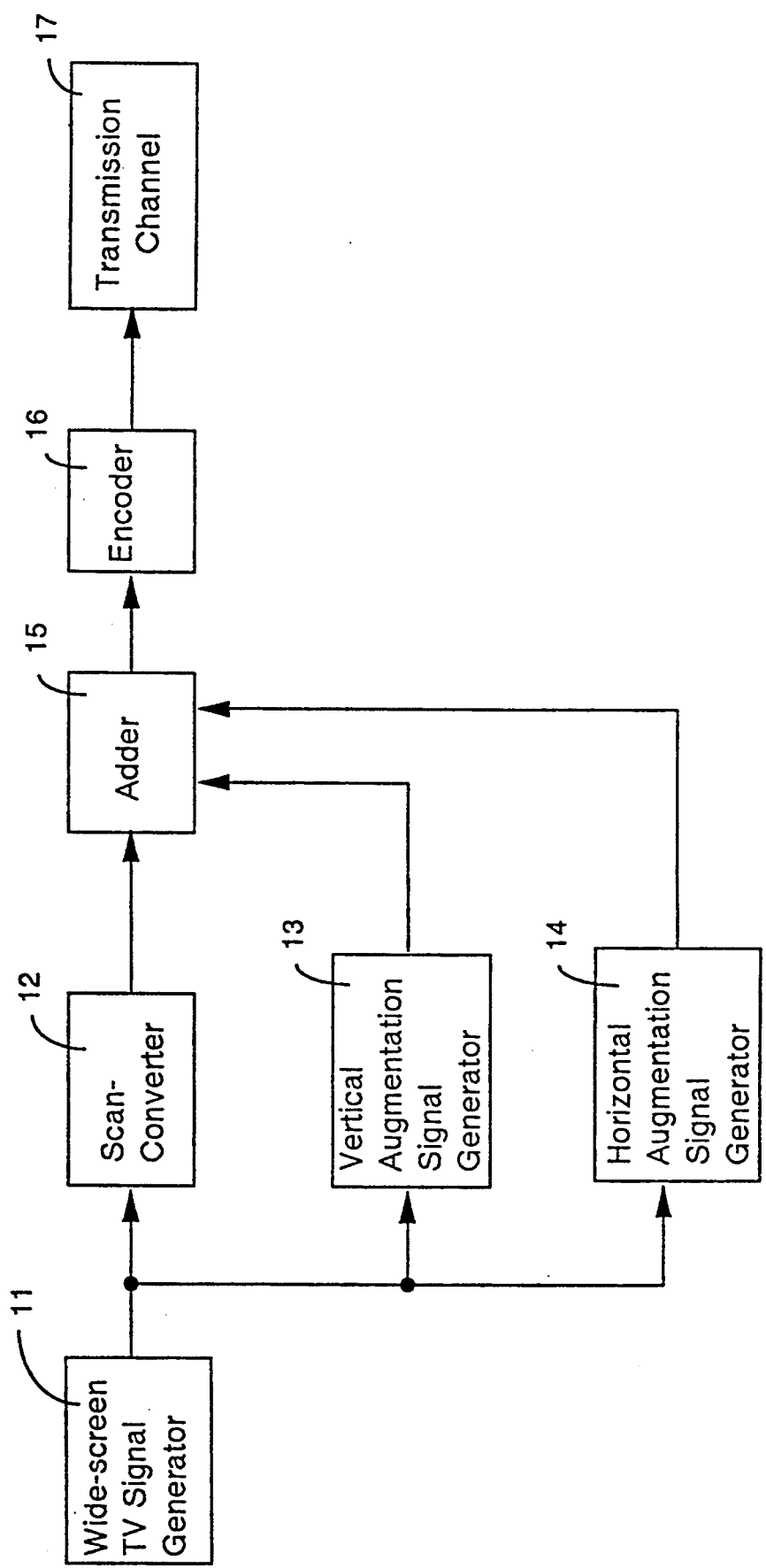
FIG. 1(a) and FIG. 8(a) are block diagrams of the transmitting side of a wide-screen TV signal transmitting apparatus embodying this invention.
Figure 1:
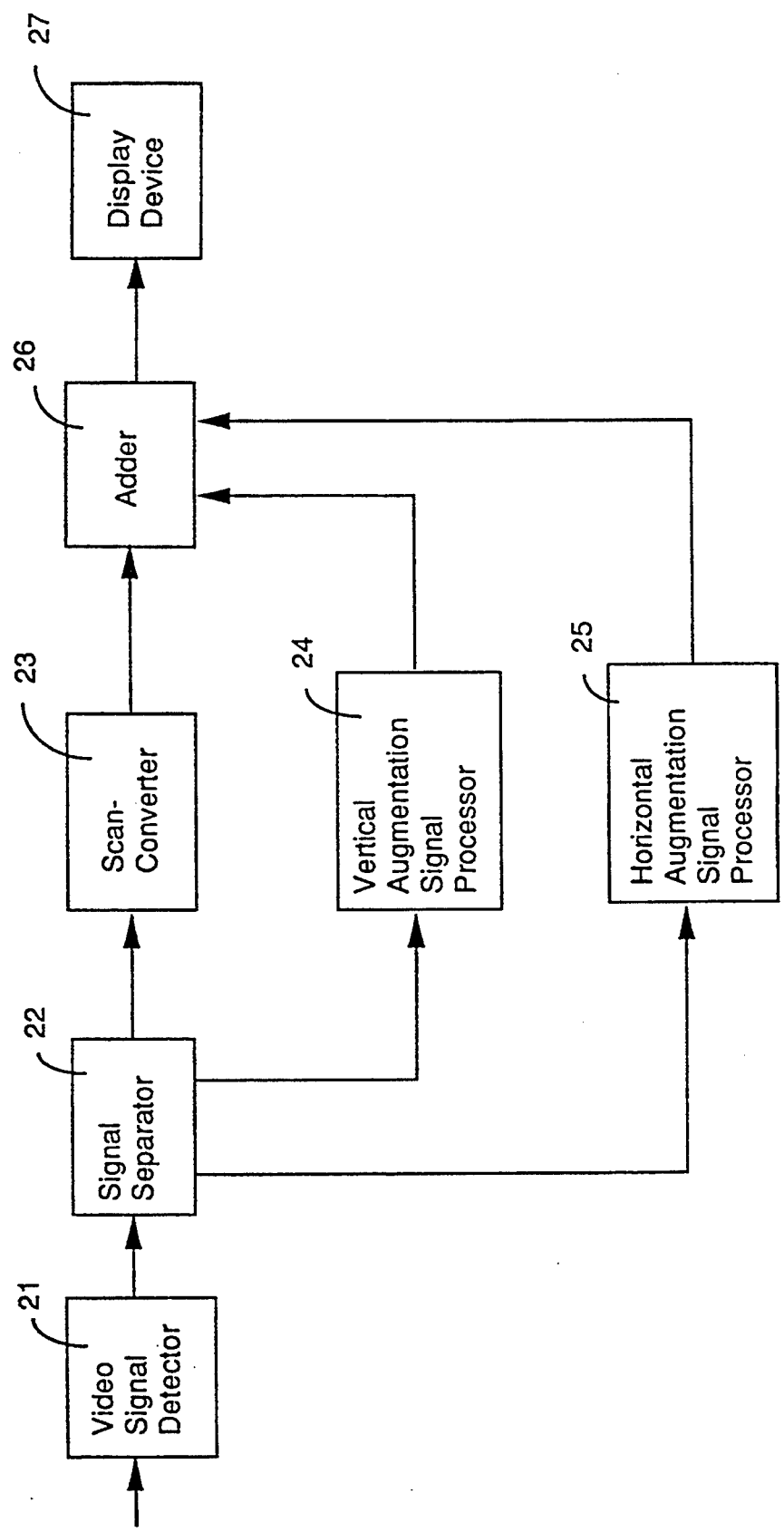
FIG. 1(b) and FIG. 8(b) are block diagrams of the receiving side of a wide-screen TV signal transmitting apparatus embodying this invention.

In FIG. 1(a), a block diagram of a transmitting side of a wide-screen TV signal transmitting apparatus embodying this invention is shown.

In FIG. 1(a), a wide-screen TV signal generator 11 has a larger aspect ratio than the conventional standard of 4:3, and may have 1.5 times the number of horizontal scanning lines of the conventional TV standard, and especially for NTSC, it has 787.5 lines. In this case, the effective number of horizontal lines are 720, and in each field there are 360 lines because of 2:1 interlacing. A wide-screen TV signal from the wide-screen TV signal generator 11 is introduced to a scan-converter 12, a vertical augmentation signal generator 13, and a horizontal augmentation signal generator 14.

In the scan-converter 12, the effective number of horizontal lines are reduced to 360 lines, in this example, from 720 to 360. FIG. 2(a) shows the wide-screen TV signal which has 787.5 lines in a frame, or 360 effective lines in a field. The scan converter 12 converts 360 lines to 180 lines as shown in FIG. 2(b) by simply choosing a line from two adjacent lines. In order to prevent vertical aliasing, the input wide-screen TV signal to the scan-converter should pass through a low-pass filter first, choosing every other line, and time-expansion by 1.5. FIG. 2(c) shows how the time-expanded 180 lines are fit into the center portion of a new field. The upper and bottom 30 lines are left for transmitting a vertical augmentation signal.

The vertical augmentation signal generator 13 generates a vertical augmentation signal based on 180 lines which are thrown away at the scan-converter 12 in order to reconstruct a full vertical resolution wide-screen image at the receiving side. For transmitting the vertical augmentation signal, any channel within the conventional 6 MHz bandwidth must be used to maintain the compatibility. For this purpose many channels are proposed just as quadrature modulation of the video carrier, but here we use the upper and lower bars.

Figure 3:
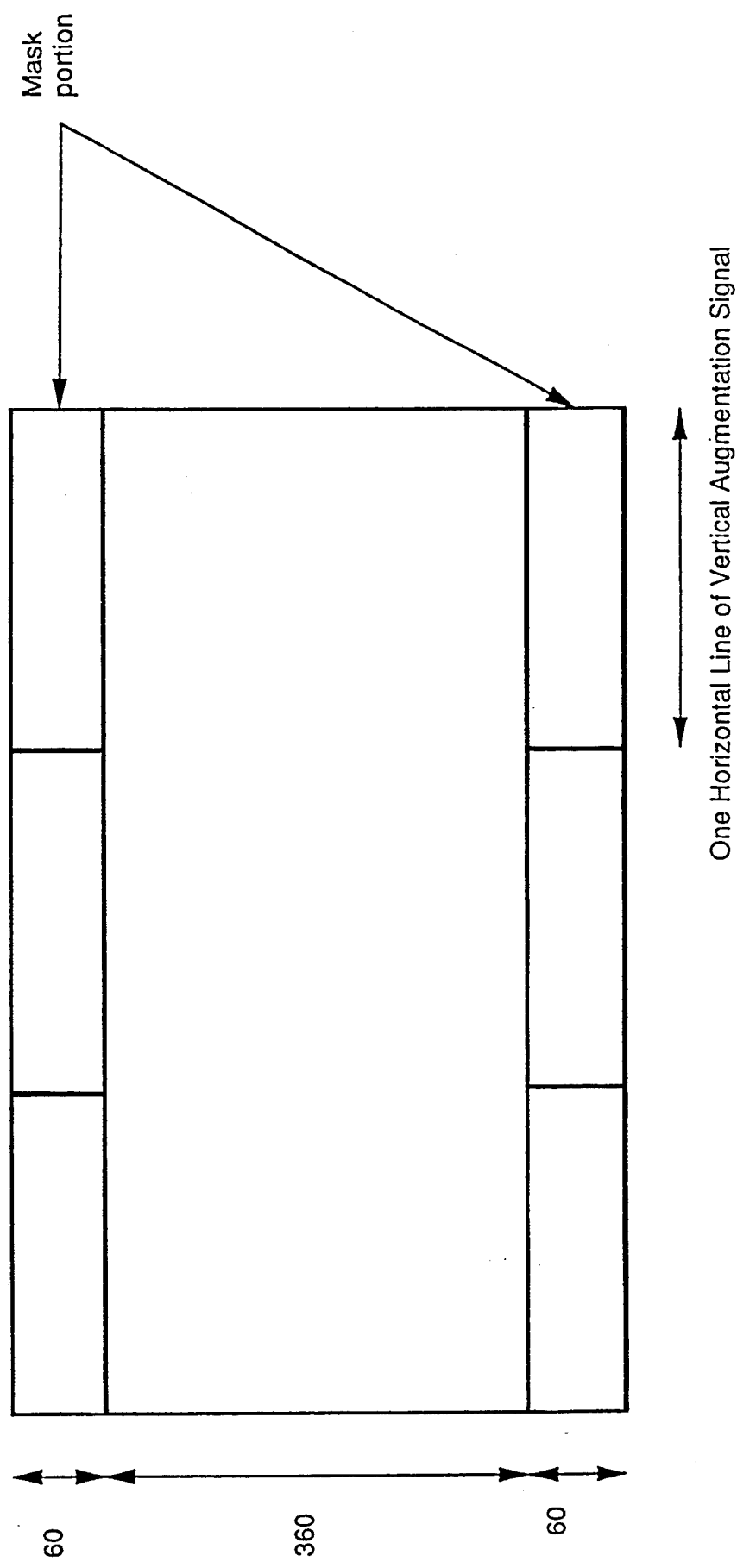
FIG. 3 is an example of a picture format for use in a wide-screen TV signal transmitting apparatus.

The upper and lower bars correspond to the left and right broad lines in FIG. 2(c). FIG. 3 shows a display screen of this signal. In this example, the 180 lines are band-limited and time-compressed by 3, respectively, and transmitted through mask portions. This processing enables all of 180 lines can fit into the mask portions, or bars. These bars had better to be black, but it is possible to transmit any signal with reduced level to prevent the distinctive appearance on the conventional receiver.

The horizontal augmentation signal generator 14 accepts the wide-screen TV signal from the wide-screen TV signal generator and generates a horizontal augmentation signal. To maintain the compatibility with the conventional standard and enhance the horizontal resolution, the horizontal augmentation signal must be transmitted through any channel within the 6 MHz bandwidth. One proposal is using quadrature modulation of the video carrier, and another is to multiplex in the conjugate position of a chrominance sub-carrier in the 3-dimensional frequency space. When the enhancement of the horizontal resolution is unnecessary, this signal generator 14 may be avoided.

As the next step, the output signal from the scan-converter 12, the vertical augmentation signal, and the horizontal augmentation signal are added by an adder 15. This adder means multiplexing the vertical augmentation signal into the upper and lower bars, and multiplexing the horizontal augmentation signal into the conjugate position of a chrominance sub-carrier, for example. An encoder the 16, for example, encodes incoming signal into the NTSC standard, and so on. An output signal from the encoder is transmitted through a transmission channel 17. This transmission channel may be an on-the-air power transmitter, or a cable distribution channel.

FIG. 1(b) shows a block diagram of a receiving side of a wide-screen TV signal transmitting apparatus embodying this invention.

In FIG. 1(b), the incoming signal may be an modulated video signal from a on-the-air channel or CATV after passing through a tuner of a TV receiver. A video signal detector 21 detects this signal, generates a baseband video signal and supplies it to a signal separator 22. The signal separator works as a decoder of the NTSC signal as an example and generates luminance and chrominance signals. It is assumed that an output signal from the signal separator 22 is a luminance signal here, but exactly the same circuit can be applied to a chrominance signal, as an output of the signal separator 22, in this block diagram. Therefore, the circuits used for the chrominance signal are omitted from this diagram.

The output signal from the signal separator 22, the luminance signal for an example, can be introduced to a scan-converter 23, a vertical augmentation signal processor 24, and a horizontal augmentation signal processor 25. The horizontal augmentation signal processor can be avoided unless necessary. FIGS. 4(a)–4(c) show how the scan-converter 23 works, and FIGS. 4(a), 4(b) and 4(c) show a portion of the scanning line structure at the transmission, a portion of the scanning line structure at displaying of the prior art, and a portion of scanning line structure of this invention, respectively. In this figure, the vertical direction means the vertical direction of a picture, and white circle and black circle show the scanning line of the first field and the second field, respectively.

As shown in FIG. 4(a), the number of effective horizontal scanning lines is 180 at the transmission because the upper and lower 60 lines in total are black bars or additional signal, just as vertical augmentation signal, multiplexed. According to the prior art, at a receiver to receive this transmission format, a scan-converter from 180 to 240 lines is incorporated, but this conversion requires a large volume of complex circuits because 4 lines must be formed from 3 lines. This conversion is clearly one of the disadvantages of the prior art. According to this invention, as shown in FIG. 4(c), a scan-converter from 180 to 360 lines is used without any special interpolation, which means a simple and small circuit. This conversion is just exactly the opposite operation of the transmitting side, or a time-compression by 1.5 and twice usage of the same line.

The vertical augmentation signal, recovered at the vertical augmentation signal processor 24 from the bars, can be added to each line in order to restore the original high resolution wide-screen image. The vertical augmentation signal, however, is band limited by $\frac{1}{3}$ at the transmitting side; therefore, a diagonal region in the vertical-horizontal frequency space cannot be restored. But the human eyes are not sensitive to this region.

An adder 26 adds the output signal from the scan-converter 23, the vertical augmentation signal from the vertical augmentation signal processor 24, and the horizontal augmentation signal from the horizontal augmentation signal processor 25 if any, and generates a wide band wide-screen TV signal. An output of the adder 26 can supply 360 lines per field wide-screen image to a display device 27.

FIGS. 5(a) through 7(c) are for explaining an idea of the difference between the prior art and this invention. FIGS. 5(a)–5(c) show the prior art, and FIGS. 5(a), 5(b) and 5(c) show the original wide-screen image with 16:9 aspect ratio, a transmission image using a letter box format, and a regenerated image with 480 lines per frame, respectively. In this figure, a 525/2:1 signal is shown as the original wide-screen image; therefore, it is rather complicated to get 360 lines out of it. It is also difficult to obtain the vertical augmentation signal from the 525/2:1 signal to fit into the upper and lower bars, or 60 lines in total.

FIGS. 6(a)–6(c) show an idea of this invention when applied to the NTSC standard, and FIG. 6(a) shows the original image in which the number of horizontal lines are 787.5, 2:1 interlace scanning, and the number of effective lines is 720. From this original picture, simply taking every other line converts 720 lines to 360 lines and fits them into the center portions of the NTSC format. FIG. 6(b) shows a transmitting image of this new format, where the upper and lower bars are mask portion for transmitting the vertical augmentation signal. FIG. 6(c) shows a regenerated image at the receiving side in which the number of effective lines. This conversion is also simple. This simplicity is an advantage of this invention.

FIGS. 7(a)–7(c) shows an idea of this invention when applied to the PAL standard, and FIG. 7(a) shows the original image in which the number of horizontal lines are 937.5, 2:1 interlace scanning, and the number of effective lines is 862. From this original picture, simple taking every other line converts 862 lines to 431 lines and fits them into the center portion of PAL format. FIG. 7(b) shows a transmitting image of this new format, where the upper and lower bars are mask portions for transmitting the vertical augmentation signal. FIG. 7(c) shows a regenerated image at the receiving side in which the number of effective lines are 862 again. This conversion is also simple. This simplicity is an advantage of this invention.

It is clear from the above description that $p \times 12 \times n/m$ lines (p: effective scanning lines of the conventional TV standard, $n = 1, 2, 3 \ldots$, m:9 (m > 12): aspect ratio of image to be transmitted) can be selected as a wide-screen TV signal source, such as camera, VTR, and signal generator so that one can realize simple conversion to fit into $p \times 12/m$ lines of the conventional TV format with letter box method. Similarly, selecting $p \times 12 \times n/m$ lines as the horizontal scanning line of display device enables one to realize a receiver in wide-screen TV signal transmitting apparatus with a simple and small circuit. This method can maintain the compatibility with the conventional system; therefore one can continue using the conventional TV receiver. Also, it is possible to transmit a wide-screen TV signal with the same bandwidth as before, so one can say this system is very effective in terms of preserving frequency spectrum resources.

Figure 8:
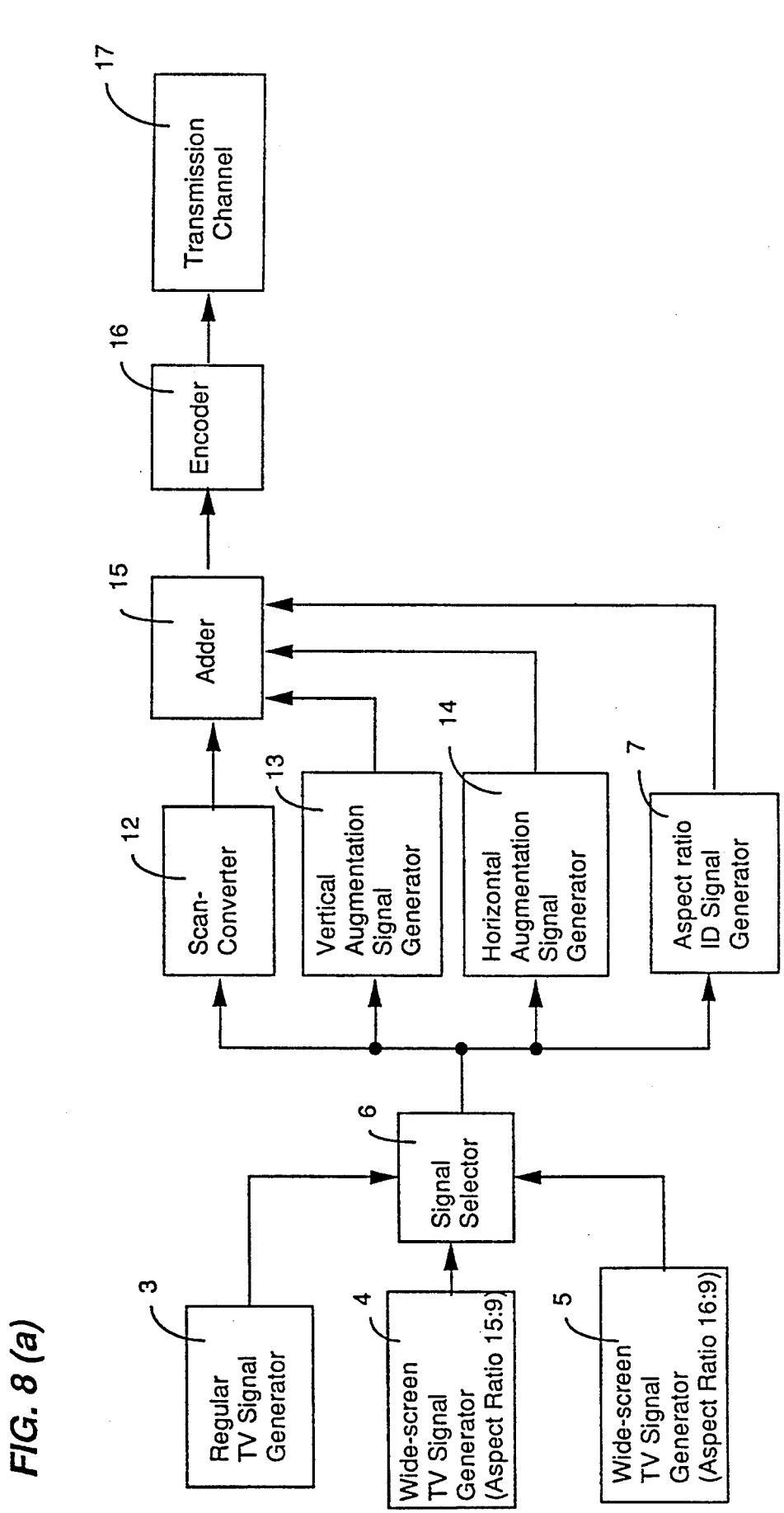

FIG. 8(a) shows a block diagram showing another wide-screen TV signal transmitting apparatus at the transmitting side as an embodiment of this invention. In this scheme, one can select various aspect ratio images, such as conventional 4:3, 15:9, and 16:9 by choosing regular TV signal generator 3, wide-screen TV signal generator (aspect ratio 15:9) 4, or wide-screen TV signal generator (aspect ratio 16:9) 5, through a signal selector 6. A TV signal from the signal selector 6 is fed to scan-converter 12, vertical augmentation signal generator 13, horizontal augmentation signal generator 14, and aspect ratio ID (identification) signal generator 7. In the aspect ratio ID signal generator 7, the aspect ratio of incoming TV signal is detected and transmitted, for instance, during the vertical blanking period in order for a receiver to distinguish the aspect ratio of images to be transmitted. All other blocks in this figure are the same as those in FIG. 1(a).

FIG. 8(b) shows a block diagram showing another wide-screen TV signal transmitting apparatus at the receiving side as an embodiment of this invention. A incoming base-band video signal from a video signal detector and signal separator is fed into a vertical augmentation signal processor 24, horizontal augmentation signal processor, scan-converter 23, and aspect ratio ID signal separator 8.

In the aspect ratio ID signal separator 8, the aspect ratio of the incoming TV signal is obtained and the control signal for scan-converter 23, time-axis compressor 9, and display device 27 is generated. FIGS. 9(a)-9(c) explain how to control time-axis compressor and display device. We assume we have three modes; a regular image with aspect ratio of 9:12 (4:3), a wide-screen image with 9:15, and a wide-screen image with 9:16, as shown in FIG. 9(a). When those images are transmitted through the conventional 480 lines, for example, full 480 lines, 450 lines out of 480 lines, or 360 lines are used, respectively. The original signal sources have 480 or 960 lines, 900 lines, or 720 lines, respectively, as an example due to the simplicity of the conversion. When those signals are accepted at the receiving side with ID information, the number of horizontal scanning lines are selected by controlling horizontal deflection frequency generator of the display device and horizontal effective time duration is also switched to keep correct geometry. In FIG. 9(c), this selections are shown in the case when display with aspect ratio of 9:16 is used.

What is claimed is:

1. A wide-screen television signal transmitting apparatus comprising:
    a wide-screen television signal generating means for generating at least two wide-screen television signals which have different aspect ratios and a different number of horizontal scanning lines from each other;
    a selecting means for selecting one of said at least two wide-screen television signals;
    a scan converting means for down-converting the number of effective horizontal scanning lines of a selected wide-screen television signal at a conversion ratio of 2 to 1 to obtain a conventional television-compatible signal with upper and lower black bars which include some lines dependent on said selected wide-screen television signal;
    a vertical augmentation signal generating means for generating a vertical augmentation signal having information for enhancing vertical resolution at a receiver;
    a multiplexing means for multiplexing an identification signal indicative of an aspect ratio of said selected wide-screen television signal with said convention television-compatible signal;
    an adding means for adding said conventional television-compatible signal and said vertical augmentation signal to obtain a conventional television-compatible composite signal; and
    a transmitting means for transmitting said conventional television-compatible composite signal.

2. An apparatus according to claim 1, further comprising a horizontal augmentation signal generating means for generating a horizontal augmentation signal having information for enhancing horizontal resolution at the receiver, wherein said adding means adds said conventional television-compatible signal, said vertical augmentation signal and said horizontal augmentation signal to obtain said conventional television-compatible composite signal.

3. A wide-screen television signal receiving apparatus comprising:
    a video signal detecting means for detecting a video signal from a transmitted modulated conventional television-compatible composite signal to obtain a base-band conventional television-compatible composite signal;
    a signal separating means for separating a conventional television-compatible signal with upper and lower black bars from said base-band conventional television-compatible composite signal;
    an identification signal separating means for separating an identification signal which is transmitted and which is indicative of an aspect ratio of said conventional television-compatible signal;
    a scan converting means for up-converting the number of effective horizontal scanning lines of said conventional television-compatible signal with upper and lower black bars at a conversion ratio of 1 to 2 to obtain a wide-screen television signal which is free of upper and lower black bars;
    a time-axis compressing means for time-axis compressing said wide-screen television signal according to said identification signal;
    a vertical augmentation signal processing means for recovering a vertical augmentation signal for enhancing vertical resolution transmitted through said upper and lower black bars;
    an adding means for adding said wide-screen television signal and said vertical augmentation signal to obtain a vertical resolution enhanced wide-screen television signal;
    a displaying means for displaying said vertical resolution enhanced wide-screen television signal; and
    a deflection control means for controlling deflection of said display means according to said identification signal.

4. An apparatus according to claim 3, further comprising a horizontal augmentation signal processing means for recovering a horizontal augmentation signal transmitted for enhancing horizontal resolution, wherein said adding means further adds said horizontal augmentation signal.

* * * * *